United States Patent
Milo et al.

(10) Patent No.: US 8,015,124 B2
(45) Date of Patent: Sep. 6, 2011

(54) METHOD FOR DETERMINING NEAR DUPLICATE DATA OBJECTS

(75) Inventors: Amir Milo, Kfar Saba (IL); Yiftach Ravid, Rosh Haayin (IL)

(73) Assignee: Equivio Ltd (IL)

( * ) Notice: Subject to any disclaimer, the term of this patent is extended or adjusted under 35 U.S.C. 154(b) by 826 days.

(21) Appl. No.: 11/572,441

(22) PCT Filed: Jul. 7, 2005

(86) PCT No.: PCT/IL2005/000726
§ 371 (c)(1),
(2), (4) Date: Jan. 22, 2007

(87) PCT Pub. No.: WO2006/008733
PCT Pub. Date: Jan. 26, 2006

(65) Prior Publication Data
US 2009/0028441 A1 Jan. 29, 2009

Related U.S. Application Data

(60) Provisional application No. 60/589,596, filed on Jul. 21, 2004.

(51) Int. Cl.
*G06F 15/18* (2006.01)
(52) U.S. Cl. .......................................... 706/12; 706/21
(58) Field of Classification Search .................. 706/21; 707/999.101, 999.102
See application file for complete search history.

(56) References Cited

U.S. PATENT DOCUMENTS

| | | | |
|---|---|---|---|
| 5,909,677 A | 6/1999 | Broder et al. | |
| 5,950,146 A | 9/1999 | Vapnik | |
| 6,064,952 A | 5/2000 | Imanaka et al. | |
| 6,119,124 A | 9/2000 | Broder et al. | |
| 6,189,002 B1 | 2/2001 | Roltblat | |
| 6,230,155 B1 | 5/2001 | Broder et al. | |
| 6,240,409 B1 | 5/2001 | Aiken | |
| 6,349,296 B1 | 2/2002 | Broder et al. | |
| 6,380,034 B1 | 4/2002 | Vajana et al. | |
| 6,654,739 B1 * | 11/2003 | Apte et al. ........................ 1/1 |
| 6,658,423 B1 | 12/2003 | Pugh et al. | |

(Continued)

FOREIGN PATENT DOCUMENTS
WO 2004044676 A2 5/2004

OTHER PUBLICATIONS

Anthony Tomasic et al., entitled "Incremental Updates of Inverted Lists for Text document Retrieval", Dec. 9, 1993, 25 pages.

(Continued)

*Primary Examiner* — David R Vincent
*Assistant Examiner* — Mai T Tran
(74) *Attorney, Agent, or Firm* — Brooks Kushman P.C.

(57) ABSTRACT

A system for determining that a document B is a candidate for near duplicate to a document A with a given similarity level th. The system includes a storage for providing two different functions on the documents, each function having a numeric function value. The system further includes a processor associated with the storage and configured to determine that the document B is a candidate for near duplicate to the document A, if a condition is met. The condition includes: for any function $f_i$ from among the two functions, $f_i(A)-f_i(B) \leq \delta_i(f, A, \text{th})$.

51 Claims, 3 Drawing Sheets

U.S. PATENT DOCUMENTS

| | | | |
|---|---|---|---|
| 6,751,628 B2 | 6/2004 | Coady | |
| 7,260,568 B2 * | 8/2007 | Zhang et al. | 707/711 |
| 7,660,819 B1 * | 2/2010 | Frieder et al. | 707/999.107 |
| 2003/0074369 A1 * | 4/2003 | Schuetze et al. | 707/103 R |
| 2003/0167267 A1 * | 9/2003 | Kawatani | 707/6 |
| 2004/0260694 A1 * | 12/2004 | Chaudhuri et al. | 707/5 |

OTHER PUBLICATIONS

Kevyn Collins-Thompson et al., entitled "A Clustering-Based Algorithm for Automatic Document Separation", 2002, 6 pages.

Abdur Chowdhury, entitled "Duplicate Data Detection", date unknown, 8 pages.

Extended European search report including supplementary European search report and European Search Opinion for corresponding PCT Application No. PCT/IL2005/000726, mailed Apr. 1, 2011, 7 pages.

* cited by examiner

METHOD FOR DETERMINING NEAR DUPLICATE DATA OBJECTS

CROSS-REFERENCE TO RELATED APPLICATION

This application claims the benefit of U.S. provisional application Ser. No. 60/589,596 filed 21 Jul. 2004.

FIELD OF THE INVENTION

The present invention is in the general field of detecting of near duplicate documents.

BACKGROUND OF THE INVENTION

The need to detect near duplicate documents arises in many applications. Typical, yet not exclusive, an example being in litigation proceedings. In the latter one or both of the rival parties, initiates discovery proceedings which forces the rival party to reveal all the documents in his disposal that pertain to the legal dispute.

In order to meet the provisions of the discovery procedure, the disclosing party hands piles of documents, sometimes in order to duly meet the fall disclosure stipulations, or in certain other cases, as a tactical measure to flood the other party with numerous amounts of documents, thereby incurring the receiving party considerable legal expenses in the tedious task of determining which documents are relevant to the dispute under consideration. In many cases, out of the repertoire of disclosed documents, many are similar to each other. A preliminary knowledge which will group and/or flag documents that are similar one to the other, would streamline the screening process, since for example, if a certain document is classified as irrelevant, then probably all the documents that are similar thereto, are also deemed irrelevant. There are numerous other applications for determining near duplicate documents, sometimes from among a very large archive of documents (possibly at the order of e.g. millions of documents or more).

LIST OF RELATED ART

U.S. Pat. No. 6,119,124: Method for clustering closely resembling data objects.

A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints, are selected to generate a sketch of each data object. The sketches characterize the resemblance of the data objects. The sketches can be further partitioned into a plurality of groups. Each group is fingerprinted to form a feature. Data objects that share more than a certain numbers of features are estimated to be nearly identical.

U.S. Pat. No. 6,189,002: Process and system for retrieval of documents using context-relevant semantic profiles A process and system for database storage and retrieval are described along with methods for obtaining semantic profiles from a training text corpus, i.e., text of known relevance, a method for using the training to guide context-relevant document retrieval, and a method for limiting the range of documents that need to be searched after a query. A neural network is used to extract semantic profiles from text corpus. A new set of documents, such as World Wide Web pages obtained from the Internet, is then submitted for processing to the same neural network, which computes a semantic profile representation for these pages using the semantic relations learned from profiling the training documents. These semantic profiles are then organized into clusters in order to minimize the time required to answer a query. When a user queries the database, i.e., the set of documents, his or her query is similarly transformed into a semantic profile and compared with the semantic profiles of each cluster of documents. The query profile is then compared with each of the documents in that cluster. Documents with the closest weighted match to the query are returned as search results.

U.S. Pat. No. 6,230,155: Method for determining the resemining the resemblance of documents A method for facilitating the comparison of two computerized documents. The method includes loading a first document into a random access memory (RAM), loading a second document into the RAM, reducing the first document into a first sequence of tokens, reducing the second document into a second sequence of tokens, converting the first set of tokens to a first (multi)set of shingles, converting the second set of tokens to a second (multi)set of shingles, determining a first sketch of the first (multi)set of shingles, determining a second sketch of the second (multi)set of shingles, and comparing the first sketch and the second sketch. The sketches have a fixed size, independent of the size of the documents. The resemblance of two documents is provided, using a sketch of each document. The sketches may be computed fairly fast and given two sketches, the resemblance of the corresponding documents can be computed in linear time in the size of the sketches.

U.S. Pat. No. 6,240,409: Method and apparatus for detecting and summarizing document similarity within large document sets A method and apparatus are disclosed for comparing an input or query file to a set of files to detect similarities and formatting the output comparison data are described. An input query file that can be segmented into multiple query file substrings is received. A query file substring is selected and used to search a storage area containing multiple ordered file substrings that were taken from previously analyzed files. If the selected query file substring matches any of the multiple ordered file substrings, match data relating to the match between the selected query file substring and the matching ordered file substring is stored in a temporary file. The matching ordered file substring and another ordered file substring are joined if the matching ordered file substring and the second ordered file substring are in a particular sequence and if the selected query file substring and a second query file substring are in the same particular sequence. If the matching ordered file substring and the second query file substring match, a coalesced matching ordered substring and a coalesced query file substring are formed that can be used to format output comparison data.

U.S. Pat. No. 6,349,296: Method for clustering closely resembling data objects

A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints, are selected to generate a sketch of each data object. The sketches characterize the resemblance of the data objects. The sketches can be further partitioned into a plurality of groups. Each group is fingerprinted to form a feature. Data objects that share more than a certain numbers of features are estimated to be nearly identical.

U.S. Pat. No. 6,658,423: Detecting duplicate and near-duplicate files

Improved duplicate and near-duplicate detection techniques may assign a number of fingerprints to a given document by (i) extracting parts from the document, (ii) assigning the extracted parts to one or more of a predetermined number of lists, and (iii) generating a fingerprint from each of the populated lists. Two documents may be considered to be near-duplicates if any one of their respective fingerprints match.

U.S. Pat. No. 6,654,739: Lightweight document clustering

A procedure for clustering documents that operates in high dimensions processes tens of thousands of documents and groups them into several thousand clusters or, by varying a single parameter, into a few dozen clusters. The procedure is specified in two parts: computing a similarity score representing the k most similar documents (typically the top ten) for each document in the collection, and grouping the documents into clusters using the similar scores.

U.S. Pat. No. 6,751,628: Process and system for sparse vector and matrix representation of document indexing and retrieval A new data structure and algorithms which offer at least equal performance in common sparse matrix tasks, and improved performance in many. This is applied to a word-document index to produce fast build and query times for document retrieval.

Abdur Chowdhury Duplicate Data Detection

The algorithm is based on IDF of the tokens. The algorithm steps are:
1. Get document.
2. Parse document into a token steam, removing format tags.
3. Using term thresholds (idf), retain only significant tokens.
4. Insert relevant tokens into unicode ascending ordered tree of unique tokens.
5. Loop through token tree and add each unique token to the SHA1 (1995) digest. Upon completion of token tree loop, a (doc_id, SHA1 Digest) tuple is defined.
6. The tuple (doc_id, SHA1 Digest) is inserted into the storage data structure based on SHA1 Digest key.
7. If there is a collision of digest values, then the documents are similar.

Conrad et. Al: In a series of a few papers, they describe a method that is based on the IDF measure of tokens, and the size of the documents. They are also provided a method of selecting the corpus to evaluate the IDF of a token.

There is a need in the art to provide for a new system and method for determining near duplicate objects. There is still further need in the art to provide for a new system and, method for determining near duplicate documents.

SUMMARY OF THE INVENTION

In accordance with an aspect of the invention there is provided a method for determining that at least one data object B is a candidate for near duplicate to a data object A with a given similarity level th, comprising i) providing from a storage at least two different functions on a data object, each function having a numeric function value;

(ii) determining by a processor that at least one data object B is a candidate for near duplicate to a data object A, if a condition is met, the condition includes: for any function $f_i$ from among the at least two functions, $|f_i(A)-f_i(B)| \leq \delta_i(f, \text{th}))$, wherein $\delta_i$ is dependent upon at least $f$,th In accordance with an embodiment of the invention, there is presented a method wherein the data objects being documents.

In accordance with an embodiment of the invention, there is presented a method wherein for a function $f$ the at least one characteristic being that $f$ is bound by a minimum value min and a maximum value max, and wherein the $\delta(f,\text{th})=\alpha(\text{th}) \cdot |\text{max}-\text{min}|$.

In accordance with an embodiment of the invention, there is presented a method wherein $\alpha(\text{th})=1-\text{th}$.

In accordance with an embodiment of the invention, there is presented a method wherein for a function $f$ the at least one characteristic being that $f$ is not bound by a minimum value min and a maximum value max, and wherein $\delta$ is also dependent upon A wherein $\delta(f,\text{th},A)=\alpha(\text{th}) \cdot f(A)$.

In accordance with an embodiment of the invention, there is further presented a method wherein $\alpha(\text{th})=1-\text{th}$.

In accordance with an embodiment of the invention, there is still further presented a method wherein at least one of the functions being a classifier.

In accordance with an embodiment of the invention, there is presented a method, wherein the classifiers being of a classifier type selected from a group that includes Bayesian Classifier, Decision Trees, Support Vector Machine Classifier.

In accordance with an embodiment of the invention, there is presented a method wherein at least one of the functions is a distance function.

In accordance with an embodiment of the invention, there is further presented a method wherein the providing of distance function includes generating for each document a vector of features where each entry in the vector is the frequency/occurrence of the feature, a feature being words from the documents.

In accordance with an embodiment of the invention, there is presented a method wherein the distance function is a member of a group that includes: $L^\infty$ (Maximum distance), $L^2$ (Euclidian distance), $L^1$ (sum of differences), and JS (Jensen-Shannon) distance between the two vectors.

In accordance with an embodiment of the invention, there is still further presented a method wherein providing from a storage at least two different functions on a data object, each function having a numeric function value, and determining by a processor that at least one data object B is a candidate for near duplicate to a data object A, if a condition is met, the condition includes: for any function $f_i$ from among the at least two functions $|f_i(A)-f_i(B)| \leq \delta_i(f,\text{th})$, wherein $\delta_i$ is dependent upon at least $f$,th are applied on-line in respect of each new received object.

In accordance with an embodiment of the invention, there is still further presented a method further comprising providing a database for storing signatures of data objects and determining if a data object has already been processed, including:

i) associating to a data object a respective unique identification code;

ii) calculating a signature for the data object;

iii) checking if the calculated signature is stored in the database in which case the data object has already been processed; if not applying (i) and (ii) in respect of the data object and at least one other data object in order to determine whether the data object and at least one other data object are near candidates.

In accordance with an embodiment of the invention, there is still further presented a method wherein the signature being checksum on an object or derivative thereof.

In accordance with an embodiment of the invention, there is still further presented a method wherein the database being hash table.

In accordance with an embodiment of the invention, there is still further presented a method further comprising applying at least one additional calculation phase in order to determine whether candidates of near duplicate data objects meet a criterion for near duplicate data objects.

In accordance with an embodiment of the invention, there is still further presented a method wherein the additional calculation phase including calculating a resemblance between two documents.

In accordance with an embodiment of the invention, there is still further presented a method wherein additional calculation phase including:
  i. calculating intersection between two candidates for near duplicate objects by calculating number of shingles that are shared by the two;
  ii. calculating union of two candidates for near duplicate data objects by calculating number of shingles that reside in either data objects;
  iii. determining that the two data objects are near duplicate by calculating the resemblance, and in case the result exceeding a predetermined value constituting the criterion, the data objects are near duplicate.

In accordance with an embodiment of the invention, there is still further presented a method, further comprising, applying an optimization for discarding candidates for near duplicate data objects having a resemblance that drops below the predetermined value.

In accordance with an embodiment of the invention, there is still further presented a method wherein the at least one additional calculation phase is slower than the calculation of candidates of near duplicate documents, for any two documents.

In accordance with an embodiment of the invention, there is still further presented a method further comprising:
  i) applying at least one additional calculation phase in order to determine whether candidates of near duplicate data objects meet a criterion for near duplicate data objects;
  ii) applying a learning phase based on data objects that are determined to be candidates for near duplicate, but did not meet the criterion for near duplicate data objects.

In accordance with an embodiment of the invention, there is still further presented a method wherein applying a learning phase based on data objects that are determined to be candidates for near duplicate, but did not meet the criterion for near duplicate data objects, further comprises providing additional at least one function capable of discerning between data objects which were classified as candidates for near duplicate in a first phase, but did not meet the criterion in the additional phase; and applying at least one additional calculation phase in order to determine whether candidates of near duplicate data objects meet a criterion for near duplicate data objects, and applying a learning phase based on data objects that are determined to be candidates for near duplicate, but did not meet the criterion for near duplicate data objects for determining candidates for near duplicate, for any function from among the at least two functions and the additional at least one function.

In accordance with an embodiment of the invention, there is still further presented a method wherein at least one of the additional functions being a classifier.

In accordance with an embodiment of the invention, there is still further presented a method further comprising: applying providing from a storage at least two different functions on a data object, each function having a numeric function value, and determining by a processor that at least one data object B is a candidate for near duplicate to a data object A, if a condition is met the condition includes: for any function $f_i$ from among the at least two functions, $|f_i(A)-f_i(B)| \leqq \delta_i(f, th)$, wherein $\delta_i$ is dependent upon at least $f$, th respect of more than two data objects in order to determine whether at least two of the data objects are near duplicate.

In accordance with an embodiment of the invention, there is still further presented a method wherein at least two of the functions are of different type.

In accordance with an embodiment of the invention, there is still further presented a method wherein the condition is implemented using bucket data structure.

In accordance with an embodiment of the invention, there is still further presented a method wherein the data objects being voice data, and further comprising, converting the data objects to respective text based documents.

In accordance with an embodiment of the invention, there is still further presented a method wherein the documents include at least text and/or numbers.

In accordance with an embodiment of the invention, there is still further presented a method wherein the documents are Microsoft Office® documents.

In accordance with an embodiment of the invention, there is still further presented a method wherein the documents are e-mails in selected format.

In accordance with an embodiment of the invention, there is still further presented a method wherein the format being a member selected from a group that includes Microsoft Outlook, Lotus Notes.

In accordance with an embodiment of the invention, there is still further presented a method wherein at least one of the functions being the number of features from known type in a document.

In accordance with an embodiment of the invention, there is still further presented a method for use in one or more members of the group that includes the following applications: document management, content management, digitization, legal, business intelligence, military intelligence, search engines results pre- and post-processing, archiving, source code comparisons, management of email servers, management of file servers.

In accordance with an embodiment of the invention, there is still further presented a method wherein the applications are marketed as a stand-alone application.

In accordance with an embodiment of the invention, there is still further presented a method wherein the applications are marketed as (OEM).

In accordance with an aspect of the invention, there is still further presented a method for determining that a document A is a candidate for near duplicate to at least one other document B, comprising:
  i) providing from a storage at least two different bounded functions $f$ on document, and for each classifier providing a vector with n buckets where n is a function of th, each of size 1/n
  ii) receiving the document A, associating a unique document id to the document, and calculating a list of features by a processor;

iii) calculating by the processor a rank=ƒ(A), where A being the list of features of the documents;

iv) calculating by the processor, add document id to buckets in the vector, as follows: Floor(n·rank) (if greater than zero, otherwise discard this option), Floor(n·rank)+1, and Floor(n·rank)+2 (if less than n, otherwise discard this option)

v) calculating union on documents id in the buckets, giving rise to set of documents id;

vi) applying by the processor (ii)-(v), in respect to a different classifier from among the at least two classifiers, giving rise to respective at least two sets of documents id;

vii) applying by the processor intersection to the at least two of the sets, stipulated in (vi), giving rise to at least two documents id, if any, being candidates for near duplicate.

In accordance with an embodiment of the invention, there is still further presented a method wherein the list of features being 1-grams, 2-grams, 3-grams, . . . , n-grams, where n is selected.

In accordance with an embodiment of the invention, there is still further presented a method further comprising applying at least one additional calculation phase in order to determine whether candidates of near duplicate documents meet a criterion for near duplicate documents.

In accordance with an embodiment of the invention there is still further presented a method wherein the additional calculation phase including calculating the resemblance to verify the near-equivalence.

In accordance with an embodiment of the invention, there is still further presented a method wherein additional calculation phase including:

i) calculating intersection between two candidates for near duplicate documents by calculating number of shingles that are shared by the two;

ii) calculating union of two candidates for near duplicate documents by calculating number of shingles that reside in either documents;

iii) determining that the two documents are near duplicate by calculating intersection divided by union, and in case the result exceeding a predetermined value constituting the criterion, the documents are near duplicate.

In accordance with an embodiment of the invention, there is still further presented a method further comprising, applying an optimization for discarding candidates for near duplicate documents having a shingle ratio that drops below the predetermined value.

In accordance with an embodiment of the invention, there is still further presented a method wherein the at least one additional calculation phase is slower than the calculation of candidates of near duplicate documents, for any two documents.

In accordance with an embodiment of the invention, there is still further presented a method wherein the documents being voice data, and further comprising, converting the documents to respective text based documents.

In accordance with an aspect of the invention, there is still further presented a method for determining that at least one data object B is a candidate for near duplicate to a data object A, comprising providing from a storage at least two different functions on a data object, each function having a numeric function value; determining by a processor that at least one data object B is a candidate for near duplicate to a data object A, if a condition is met, the condition includes: for any function $f_i$ from among the at least two functions, $|f_i(A)-f_i(B)| \leq \delta_i(f,A)$, wherein $\delta_i$ is dependent upon at least $f$ and A.

In accordance with an embodiment of the invention, there is still further presented a method wherein the documents being voice data, and further comprising, converting the documents to respective text based documents.

In accordance with an aspect of the invention, there is still further presented a method for determining that at least one data object B is a candidate for near duplicate to a data object A, comprising providing from a storage at least two different functions on a data object, each function having a numeric function value; determining by a processor that at least one data object B is a candidate for near duplicate to a data object A, if a condition is met, the condition includes: for any function $f_i$ from among the at least two functions a relationship between results of the function when applied to the data objects meets a given score.

In accordance with an embodiment of the invention, there is still further presented a method wherein the relationship being $|f_i(A)-f_i(B)|$, and the score being $\delta_i(f,A)$, wherein $\delta_i$ is dependent upon at least $f$ and A, and wherein the condition is met if $|f_i(A)-f_i(B)| \leq \delta_i(f,A)$.

In accordance with an embodiment of the invention, there is still further presented a method wherein the documents being voice data, and further comprising, converting the documents to respective text based documents.

In accordance with an aspect of the invention, there is still further presented a system for determining that at least one object B is a candidate for near duplicate to an object A, comprising:

a storage providing at least two different functions on an object, each function having a numeric function value;

a processor associated with the storage and configured to determine that at least one object B is a candidate for near duplicate to an object A, if a condition is met, the condition includes: for an function $f_i$ from among the at least two functions, $|f_i(A)-f_i(B)| \leq \delta_i(f,A)$, wherein $\delta_i$ is dependent upon at least $f$ and A.

In accordance with an embodiment of the invention there is still further presented a system wherein the determining that at least one object B is a candidate for near duplicate to an object A with a given similarity level th, and wherein $\delta_i$ is further dependent upon th.

In accordance with an aspect of the invention, there is still further presented a system for determining that at least one object B is a candidate for near duplicate to an object A, comprising a storage providing at least two different functions on an object, each function having a numeric function value; a processor associated with the storage, configured to determine that at least one object B is a candidate for near duplicate to an object A, if a condition is met, the condition includes: for any function $f_i$ from among the at least two functions a relationship between results of the function when applied to the objects meets a given score.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
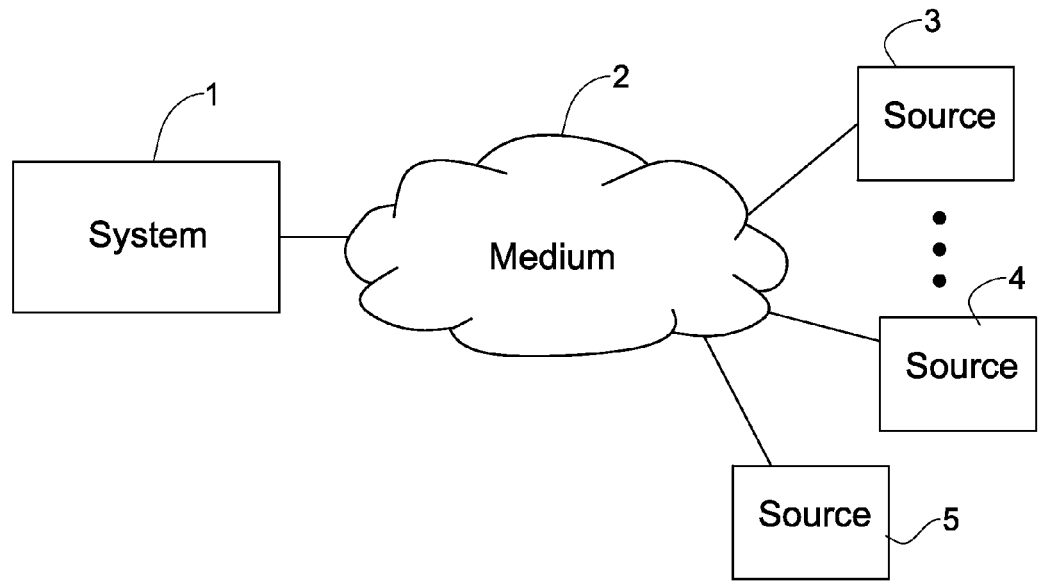
FIG. 1 illustrates a general system architecture, in accordance with an embodiment of the invention.

It should be noted that the invention is described for convenience, with reference to documents, such as files including text or representing text, such as Microsoft Word document, Excel documents, Mail documents, etc. Note that reference to documents embrace also derivative thereof, such as known per se canonic representation of a document. In accordance with certain embodiments, documents include at least text and/or numbers. In some embodiments, the documents are Microsoft Office® documents, such as e-mails in selected format. The format may be, for example, Microsoft Outlook, Lotus Notes, etc.

Note that the invention is not confined to documents, but applies also to other types of data objects, such as documents within a ZIP file, e-mails in MS Outlook PST file format, attachments, etc.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions, utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as, processor, computer, apparatus, system, sub-system, module, unit and device (in single or plural form) for performing the operations herein. This may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Bearing this in mind, attention is first drawn to FIG. 1, illustrating a general system architecture, in accordance with an embodiment of the invention. Thus, system 1 is configured to receive through medium 2 documents from one or more sources (of which three 3-5 are shown in FIG. 1). The system 1 is configured to process the documents and to output indications, which documents are near duplicate. The medium 2 may be local such that the one or more sources (3 to 5 in the example of FIG. 1) are stored in a storage medium associated with the system 1. In accordance with another embodiment, the documents are stored remotely and are transmitted, through, say, the Internet 2. System 1 may be a single computer or two or more processors accommodates locally or remotely one with respect to the other (not shown in FIG. 1).

Note that by one embodiment, the near duplicate indication can be provided as a service. Even as a service, there are few options: for instance, the files are sent to a service bureau or, in accordance with another embodiment, the application is activated via a web-service. By this embodiment, documents stored at the subscriber site (say 3 to 5 in FIG. 1), are transmitted to a near duplicate service (say 1 in FIG. 1) and are processed to determine which documents are near duplicate. The processing will be described in further detail below. The indication (possibly which are near duplicate documents) is transmitted to the subscriber, and the latter is charged according to one out of few possible charging schemes. The charging schemes include: pay per document (or some quota of documents) checked, pay per document (or some quota of documents) that is found to have a similar or exact duplicate, one time license for the software or software rental per period, OEM agreements, and others.

The subscriber may be a one time subscriber, or by way of another example, a subscriber that requires the service repeatedly. Note the invention is not bound to use by only subscribers, and accordingly, different kind of users may utilize the system and method of the invention.

The invention is not bound by any specific application. Thus, by way of non-limiting example, the near duplicate technique can be used for determining near duplicate documents in a portfolio of documents processed during M&A, between two companies or more.

Figure 2:
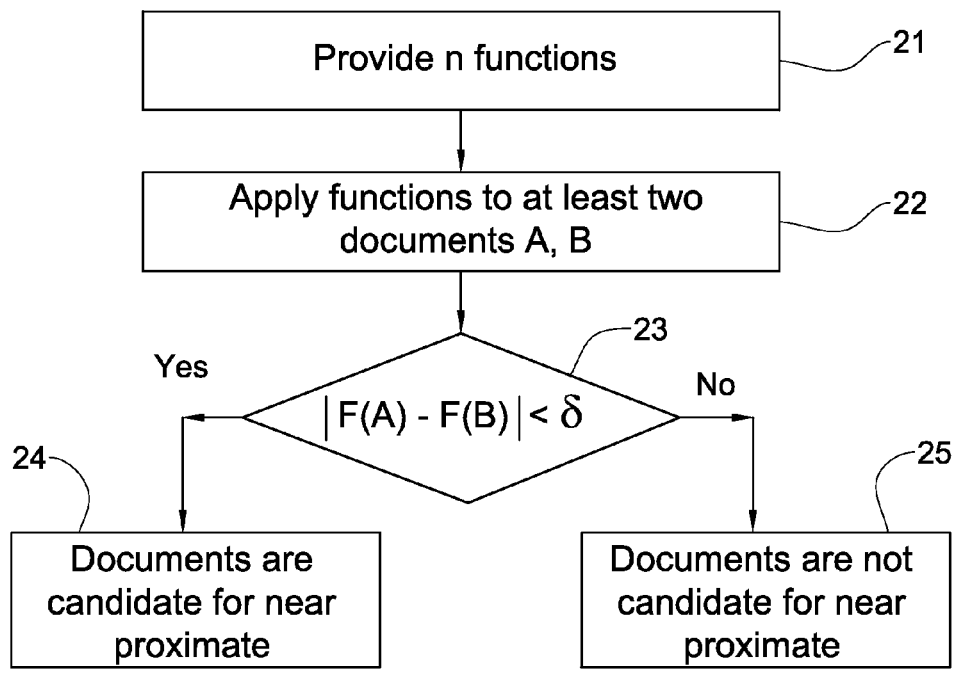
FIG. 2 illustrates a generalized sequence of operations, in accordance with an embodiment of the invention.

Bearing this in mind, attention is drawn to FIG. 2, illustrating a generalized sequence of operations, in accordance with an embodiment of the invention. Thus, at the onset, at least two different functions (say by this example $f1$ and $f2$) are provided 21. Each function is from the space of document content to a number.

In accordance with a certain embodiment, each function having a function value bound by a respective minimum value min and a maximum value max. In accordance with certain embodiment, all the functions share the same minimum and maximum values (say 0 and 1 respectively).

Typical, yet not exclusive, example of functions is the known per se classifiers capable of discerning whether input data belongs to one group or the other. Examples of classifiers are Bayesian Classifier, Decision Trees, Support Vector Machine as disclosed in U.S. Pat. No. 5,950,146. As is known, classifiers are, as a rule, constructed on the basis of two training groups.

As is well known, in operation (following the training session), if a classifier is applied to a document, it will produce a score that reflects the association of the tested document to one of the training groups. For instance, if the classifier is trained on the basis of documents belonging to a first group (documents that relate to sports) and documents belonging to a second group (documents that relate to financials), then in operation, the score of a tested document would indicate how close it is to one of the specified groups, e.g. the closer the score of the tested document to 0, it is associated to the first group and likewise, the closer the score of the tested document to 1, it is associated to the second group.

In accordance with certain embodiments, a function can be, for example, the number of features in the document. A feature for instance, may be a given word, two consecutive words, etc. In still another embodiment, a function is a distance function. In accordance with certain embodiments, where a distance function(s) is used, each document is represented by a vector of numbers. Each number in the vector indicates, say the frequency (or count) of a specific word (or other combination of words) within the document. For instance, the first value (number) in the vector signifies the number of times that the word "word" appears in the document. The second value in the vector signifies the number of times that the word "other" appears in the document, and so forth.

Given now two vectors (say, for example, of the kind specified above), a distance function can be applied. For example, $L^\infty$ (Maximum distance), $L^2$ Euclidian distance (sum the squares of different values), $L^1$ (sum of the absolute differences), Jansen-Shannon divergence, etc.

Note that the invention is not bound by the specified functions, which are provided by way of example only.

In accordance with certain embodiments, a hybrid or combination of functions can be used. For example, $f1$ and $f2$ are classifiers, and $f3$ and $f4$ are distance functions. Other variants are applicable, depending upon the particular application.

Having described the characteristics of various functions, attention is drawn again to FIG. 2. The next stage (after providing at least two functions) is that the functions are applied to the documents 22. Any two documents A, B are determined to be candidates for near duplicate with level th if a condition is met. The condition includes: for any of the functions $f1$ and $f2$ (in the particular case that two functions are provided and for any of the n functions in another case that n functions are provided), when applied to documents A and B, $|f(A)-f(B)| \leq \delta(f,th,A)$, where $\delta$ is a function of at least $f$, th, and A. (23). Threshold th indicates the level of certainty of candidates for the near duplicate test. Consider, by way of non-limiting example, that a function $f$ is number of words and a document A having, say 250 words. If the threshold th equals 0.8, this means that documents having number of words ranging from 200 (0.8·250) to 312 (1.25·250) meet the criterion of near duplicate to document A for this particular function. Note that using a threshold of the kind specified is by no means binding.

Note that in certain embodiments $\delta(th)$, wherein $\delta$ is dependent upon at least $f$ and th.

Note that in certain embodiments $\delta(f,A)$, wherein $\delta$ is dependent upon at least $f$ and A.

Note also that, in accordance with certain other embodiments, the threshold is not a parameter of the function $\delta$.

Note that the specified examples are not binding and accordingly, in certain embodiments, the condition may include additional requirements or requirement that need(s) to be met for meting the candidate for near duplicate condition.

Reverting now to the previous example, $\delta$ is dependent on $f$, th and A. Thus, in accordance with certain embodiments, in the case that the function $f$ is bound by a minimum value, min and maximum max (say, a classifier bound by the resulting values r ($0 \leq r \leq 1$)), then said $\delta(f,th)=\alpha(th)\cdot|max-min|$, as will be explained in greater detail below. In accordance with certain embodiments, $\alpha$ can be selected to be in the range of $0 \leq \alpha(th) \leq 0.6$. In accordance with other embodiments where the function $f$ is not bound by a minimum value, min and maximum max (say for example certain distances functions), then $\delta(f,th,A)=\alpha(th)\cdot f(A)$ as will be explained in greater detail below. In accordance with certain embodiments, a can be a value selected in the range of $0 \leq \alpha(th) \leq 0.6$.

In accordance with certain embodiments, when the function is total number of words in a document or a classifiers, then $\alpha(th)=1-th$. Assuming, for instance, that a function $f$ being number of words, the document A having 250 words and threshold th=0.8. Now, by this example, $\alpha(th)=1-th$, namely 0.2. $f(A)$ is 250, and accordingly $\delta(f,th,A)=\alpha(th)\cdot f(A)=50$. This means that documents having number of words between 200 and 300 (i.e. $f(B)$ in the range of 200 to 300), will comply with the algorithmic expression $|f(A)-f(B)| \leq \delta(f,th,A)$, (namely, $|250-f(B)| \leq 50$). Note that the invention is not bound by the condition $\alpha(th)=1-th$. Note also that the invention is not bound by the specified characteristics of $f$ (i.e. the specified examples of $f$ bound by max/min or, not).

If the specified conditions are met, then the documents A and B are determined to be candidates for near duplicate (24), and if the condition is not met, they are not candidates for near duplicate (25). Note that setting $\alpha$ to 0.6 is an example only. In accordance with another embodiment, it is 0.5 and in accordance with yet another example it is 0.4, and in accordance with still another embodiment, it is 0.3 and in accordance with still another embodiment, it is 0.2. These values are examples only and can be changed depending upon the particular application. For example, if the condition for determining candidates for near duplicate may also stipulate the number of classifiers used, it may affect the value of $\alpha$. For instance, the larger the number the classifiers used, the lower the maximum value of $\alpha$.

Note that a specific value can affect the desired resolution of determining near duplicate indication. For instance, in the case that $\alpha=0.1$, this means that if a function $f$ (say, in the specific case that $f$ is a classified bound by the values 0-1) when applied to documents A and B gives rise to $|f(A)-f(B)|=0.11$, it indicates that documents A and B are not candidates for near duplicate. If, on the other hand, $\alpha=0.15$, the same documents are regarded as candidates for near duplicate.

Note that in accordance with certain embodiments, the processes described above with reference to FIGS. 1 and 2, give rise to candidates for near duplicate indication, rather than final near duplicate indication. As will be explained in greater detail below, by these embodiments, additional processing phase is applied in order to determine whether candidates for near duplicate are indeed near duplicate documents (in higher degree of certainty), or not.

Those versed in the art will readily appreciate that the invention is not bound to only two documents and to only two functions. In fact, in accordance with certain embodiments, the more are the functions, the higher the prospects that the near duplicate indication is accurate.

Figure 3:
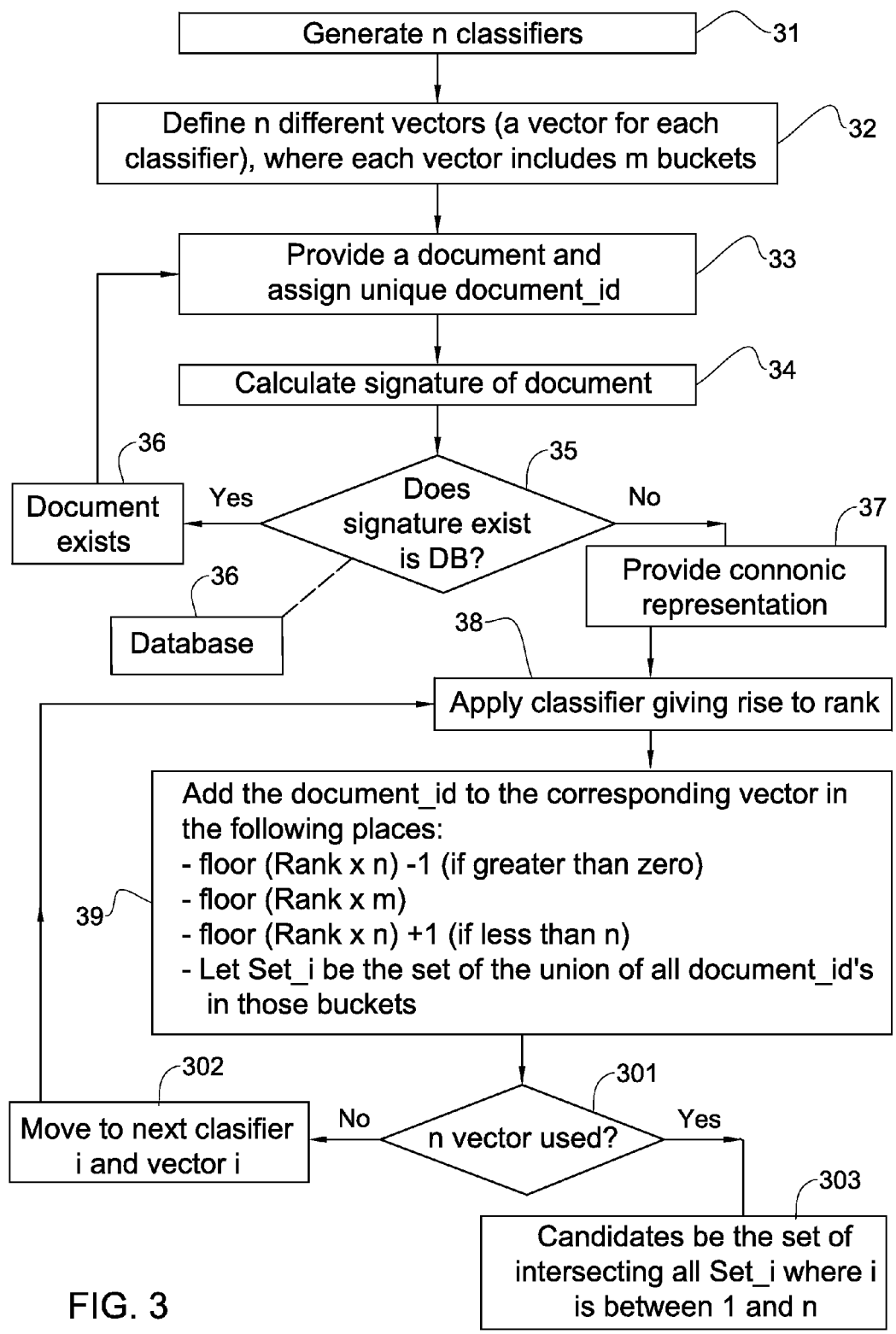
FIG. 3 illustrates a more detailed sequence of operations, in accordance with an embodiment of the invention.

Turning now to FIG. 3, there is shown a more detailed sequence of operations, in accordance with an embodiment of the invention. As will be explained in greater detail below, in accordance with this embodiment, there is provided an additional technique for accomplishing improved performance. Note that by this embodiment, the functions that are used are classifiers of type SVM. Note that the invention is not bound by the use of functions in the form of classifiers and a fortiori not by the use of the classifier of the type. Note that the specific example with reference to FIG. 3, refers to $0<\alpha\leq 0.6$.

Thus, at the onset, m (at least two) classifiers are received or generated 31. For each classifier, a different vector is generated with n different values. By one example, the vector values are buckets 32. Next, a document under consideration is received and is associated with a unique identification code 33. Next, a signature of the document is calculated say by applying known per se checksum calculation 34. There is further provided a database 36, say, hash table, storing signatures of existing documents. In the case that the so calculated signature of the document exists in the database, this indicates that the document already exists 35 and control is returned to 33 for processing the next document. If, on the other hand, the signature does not exist, this indicates that the exact document does not exist and there is a need to determine whether this document is near duplicate to other documents. If necessary, the text of the document (say, e.g. a Microsoft Word™ document) is extracted and converted to canonical representation 37, all as known per se. Thereafter, a list of features (say, the known per se shingles, normally A k-shingle is a sequence of k consecutive words) is calculated in a known per se, manner. By this non-limiting example, the 1 list of features being 1-gram (frequency of words in the document), 2-grams (frequency of consecutive 2 words in the document), etc. The invention is not bound by a specific manner of calculating the features.

Next, the classifier is applied on the document (by this example to its representatives list of features), giving rise to a first function result (38) for this particular document identification. Note that the classifiers result (m classifiers) is bound by min–max values, and by this particular example, a value that falls in the range of 0 to 1. As may be recalled, the invention is not bound by the use of functions bound by min/max value and a fortiori not those that have min value=0 and max value=1. Also, as may be recalled, a hybrid (or combination) of functions can be used, and accordingly, in certain embodiments, one or more functions can be bound by min/max value and in accordance with other embodiments, one or more functions is not bound by min/max values.

Before moving on, note incidentally, that in accordance with an embodiment of the invention, this procedure is repeated for at least one additional classifier (applied to the same document id), giving rise to a second function result (also falling in the range of 0 to 1). For convenience, the first and second results are marked as $f_1(A)$, $f_2(A)$, where A is the document under consideration. Now, if function results of applying these classifiers to another document (B) are available, say $f_1(B)$ and $f_2(B)$, it would be possible to determine whether, the documents are near duplicate. Thus, the documents would be regarded as near duplicate if $|f_1(A)-f_1(B)|\leq\alpha$ and $|f_2(A)-f_2(B)|\leq\alpha$, where by one embodiment $\alpha=0.3$.

In accordance with certain embodiments, in the case where the value of the function is not bounded by a "small" number, the bucket implementation is less applicable. Therefore, in certain embodiments, a known per se "near neighbor algorithm" is used. Thus, for each document the values of the m different functions are calculated, and fed to the "near neighbor algorithm", as an m-dimensional point. The "near neighbor algorithm" can be queried on all points that are "close" to a certain point. Hence, an efficient algorithm is obtained to find all documents that are "close" to a certain document. Note, that in certain embodiments the "approximate near neighbor algorithm" can be used in order to speed-up performance.

Figure 4:
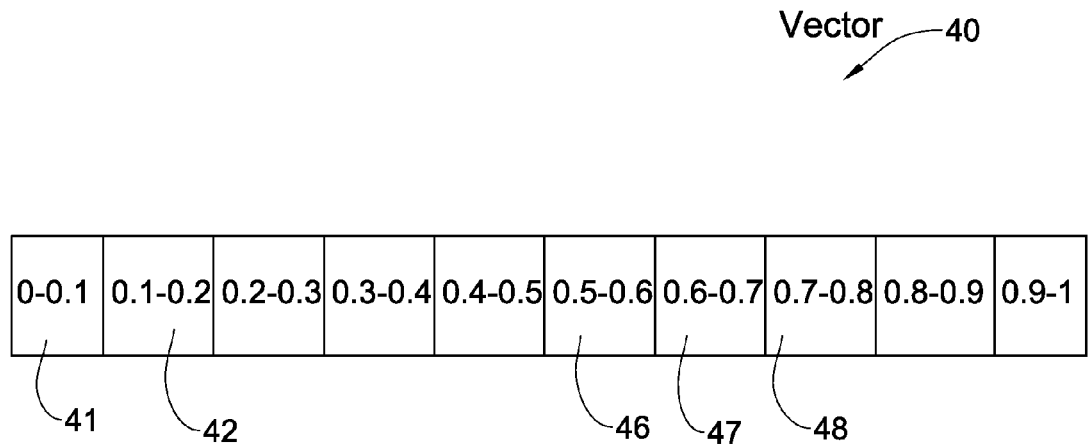
FIG. 4 illustrates an exemplary vector of buckets, used in one embodiment of the invention.

Reverting now to the embodiment of FIG. 3, a procedure for expediting determination of near duplicate documents is applied. Note that each vector is divided to n values (buckets by this specific example), where n is say 10. Thus, for the case of range 0 to 1, each bucket covers a range 0.1 as shown in the exemplary vector 40 of FIG. 4. By this example the buckets are numbered 1 to 10, where the first bucket 41 covers the values 0-0.1, the second vector 42 covers the values 0.1 to 0.2, and so forth. In the general case for n buckets, each bucket is of size 1/n.

Bearing this in mind, assuming that applying the first classifier to document A (i.e. $f_1(A)$), gives rise to function result rank (in this example rank is between 0 and 1), then the result (in fact the document id) is assigned to the buckets in the following manner (39): 1) Floor(n·rank) (if greater than zero, otherwise discard this option), Floor(n·rank)+1, and Floor (n·rank)+2 (if less than n, otherwise discard this option). n as recalled is, by this example, 10. Thus, if the rank value is say 0.69, then applying the specified stipulation would lead to bucket 6 (covering the value 0.5 to 0.6), 7 (covering the value 0.6 to 0.7) and 8 (covering the value 0.7 to 0.8), associated with reference numerals 46, 47 and 48, respectively. Put differently, the document id of this document is assigned to buckets 6, 7 and 8.

Now, as an interim step, the union of documents Ids in the buckets are calculated (for this particular classifier) and is stored in a union set for this classifier. For instance, assuming that the document identification of the present document (which, as recalled, is assigned to buckets 6, 7 and 8) is $Id_{current}$ and a previous document having, say $Id_{prev}$ that was set (for the same classifier) to, say buckets 8 and 9 (in accordance with the calculating steps discussed above), then in accordance with this step, the union set for this classifier would store $Id_{current}$ and $Id_{prev}$, since bucket 8 stores both $Id_{current}$ and $Id_{prev}$. Moving on with this example, if the identification $Id_{prev-1}$ of another document is set to, say 1, 2 and 3 (in accordance with the calculating steps discussed above), then $Id_{prev-1}$ is not included in the union set for this classifier (together with $Id_{current}$ and $Id_{prev}$), since $Id_{prev-1}$ and $Id_{current}$ do not share any bucket (in other words, the union operator results in an empty set).

The procedure is repeated for the other n vectors of the m classifiers (301 and 302) [by this specific example 2 classifiers], giving rise to n different union sets. Each set holds (for its respective classifier) the documents ids that share a common bucket.

What remains to be done is to apply intersection to the specified sets (303). The result would be document Id's that share at least one bucket for every one of the m classifiers. These documents are announced as candidate near duplicate.

Note that the utilization of buckets in the manner specified, is one out of many possible variants of implementation of the specified condition that $|f(A)-f(B)| \leq \delta(f,th)$ and since the functions are bound by max/min values, then $\delta(f,th)=\alpha(th) \cdot |max-min|$, for the at least two functions (by this example classifiers, the values are between 0 and 1). As may be recalled by this example $\alpha=0.3$. Thus, consider for example two classifiers $f_1$ and $f_2$, where the result of applying $f_1$ to a first document (having document identification $Id_1$) gives rise to a result of, say 0.65, thereby falling, in accordance with the previous example to buckets 5, 6 and 7. When applying the same classifiers $f_1$ to a second document (having document identification $Id_2$) it gives rise to a result of, say 0.89, thereby falling, in accordance with the previous example to buckets 7, 8 and 9. Now, the condition for candidates to near duplicate documents is met for $f_1$ since 0.89-0.65<0.3. If the same condition holds true when applying $f_2$ to the two documents (say 0.78 [buckets 6, 7 and 8] and 0.62 [buckets 5, 6 and 7], respectively, giving rise to a subtraction result of 0.16 being less than 0.3), then, the two documents are announced as candidates for near duplicate, since for both functions the condition is met. The same result would be obtained also when using the specific embodiment that implements the buckets. Thus, for the function $f$ documents $Id_1$ and $Id_2$ belong to the same set (since they meet the union condition due to the fact that they share bucket no. 7. They also belong to the same set for function $f_2$ since they share a bucket (by this example bucket 7). The intersection of the sets (in accordance with step 303 in FIG. 3) would lead to announcing that $Id_1$ and $Id_2$ are candidates for near duplicate.

a function result is mapped to 3 buckets, each bucket size equals to ⅓·$\alpha$. Had $\alpha$ would equal to 0.15, then each bucket size would be 0.05 (for the specific case of 3 buckets).

As mentioned before, the invention is not bound by the use buckets, and a fortiori not by the use of 3 buckets.

For a better understanding of the foregoing, consider the following example:

Assume that candidates for near-duplicate documents are found with th=80%, where all functions are bounded by 0 and 1. From the above let $\delta(f,th)=\alpha(th) \cdot |max-min|=\alpha(th)$. In the example let $\alpha(th)=0.2$. Using $\alpha(th)=0.2$, yields the use of $2/\alpha(th)=2/0,2=10$ buckets.

By these embodiments, the number of buckets is always $2/\alpha(th)$ this will insure that if the rank of $doc_1$ is x (0.39) and the rank of $doc_2$ is y (0.58). They will join a same bucket.

| | | | | | Buckets | | | | | |
|---|---|---|---|---|---|---|---|---|---|---|
| | 1 | 2 | 3 | 4 | 5 | 6 | 7 | 8 | 9 | 10 |
| Vector | 0.0-0.1 | 0.1-0.2 | 0.2-0.3 | 0.3-0.4 | 0.4-0.5 | 0.5-0.6 | 0.6-0.7 | 0.7-0.8 | 0.8-0.9 | 0.9-1.0 |
| $doc_1$ | | | X | | x | X | | | | |
| $doc_2$ | | | | | Y | y | y | | | |

Suppose there are 4 documents:
(1) Suppose that search for near-duplicate documents is performed with th=80%, and suppose $\alpha(th)=0.2$; then define $2/\alpha(th)=2/0,2=10$ buckets.
(2) Generate 3 classifiers
(2) Define 3 vectors; with 10 buckets each, the buckets are numbered 1-10. Accordingly, by this example, m-=3 and n=10.

The ranks (i.e. the results of applying the three functions on the first document are (document_1):
Classifier_1=0.33 (insert to buckets 3,4,5)
Classifier_2=0.44 (insert to buckets 4,5,6) Classifier_3=0.77 (insert to buckets 7,8,9)

The buckets after insertion document_1 looks like:

| | | | | | Buckets | | | | | |
|---|---|---|---|---|---|---|---|---|---|---|
| | 1 | 2 | 3 | 4 | 5 | 6 | 7 | 8 | 9 | 10 |
| Vector | 0.0-0.1 | 0.1-0.2 | 0.2-0.3 | 0.3-0.4 | 0.4-0.5 | 0.5-0.6 | 0.6-0.7 | 0.7-0.8 | 0.8-0.9 | 0.9-1.0 |
| 1 | | | 1 | 1 | 1 | | | | | |
| 2 | | | | 1 | 1 | 1 | | | | |
| 3 | | | | | | | 1 | 1 | 1 | |

In the specified examples, the documents A,B to which the functions were applied, were list of features obtained directly or indirectly, such as 1-grams, 2-grams, n-grams, etc.

Note that the mapping to buckets is strongly related to the value $\alpha$. Thus, when a function result is mapped to 3 buckets, each covering a range of 0.1, this results in a tolerance of 0.3, exactly the value of $\alpha$. Accordingly, for the specific case that The ranks (i.e. the results of applying the three functions on the second document (document_2) are Classifier$_{13}$ 1=0.29 (insert to buckets 2,3,4)

Classifier_2=0.50 (insert to buckets 5,6,7)

Classifier_3=0.81 (insert to buckets 8,9,10)

The buckets after insertion document__2 looks like:

| | | | | | Buckets | | | | | |
|---|---|---|---|---|---|---|---|---|---|---|
| Vector | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1 | | | | | |
| 2 | | | | 1, | | 1, 2 | 1, 2 | 2 | | |
| 3 | | | | | | | 1 | 1, 2 | 1, 2 | 2 |

Applying step 39 of FIG. 3 (union) in respect of the first function would result in document__1 and document__2 (the set for the first function) since they share buckets 3 and 4. The set of the second function will also include document__1 and document__2, since they share buckets 5 and 6. Likewise, the set of the third function will also include document__1 and document__2, since they share buckets 8 and 9. The intersection of the sets (in accordance with step 303) would result also in document__1 and document__2 (since they are included in each one of the three sets), and accordingly they are announced as near duplicate.

Moving on to document__3, the ranks of the document__3 are

Classifier__1=0.71 (insert to buckets 7,8,9)
Classifier__2=0.50 (insert to buckets 5,6,7)
Classifier__3=0.81 (insert to buckets 8,9,10)

The buckets after insertion document__3 looks like

| | | | | | Buckets | | | | | |
|---|---|---|---|---|---|---|---|---|---|---|
| Vector | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1 | | 3 | 3 | 3 | |
| 2 | | | | 1, | | 1, 2, 3 | 1, 2, 3 | 2, 3 | | |
| 3 | | | | | | | 1 | 1, 2, 3 | 1, 2, 3 | 2, 3 |

The union step for the first function will yield an empty set, since document__3 does not share any bucket with the previously analyzed document__1 and document__2. Accordingly, it is not candidate for near duplicate to the other documents, since the intersection of the sets is empty (notwithstanding the fact that for functions 2 and 3, the union would result in document__1, document__2, and document__3 included in the respective union sets). Note, incidentally, that had the requirements for determining candidates for near duplicate result would be alleviated, say by requiring that two functions meet the condition, the outcome would be reversed. Put differently, by the latter (alleviated) condition document__3 is announced as near duplicate to document__1 and document__2, since the intersection of the sets for functions 2 and 3 give rise to document__1, document__2 and document__3.

It is accordingly appreciated that the parameters that affect the determination of candidates for near duplicate indication may be configured, depending upon the particular application. Typical, yet not exclusive, example of parameters are the value of δ, the number of functions, etc.

Moving now to document__4 the ranks of the document__4 are

Classifier__1=0.55 (insert to buckets 5,6,7)

Classifier__2=0.55 (insert to buckets 5,6,7)

Classifier__3=0.55 (insert to buckets 5,6,7)

The buckets after insertion document__4 looks like

| | | | | | Buckets | | | | | |
|---|---|---|---|---|---|---|---|---|---|---|
| Vector | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1, 4 | 4 | 3, 4 | 3 | 3 | |
| 2 | | | | 1, | | 1, 2, 3, 4 | 1, 2, 3, 4 | 2, 3, 4 | | |
| 3 | | | | | 4 | 4 | 1, 4 | 1, 2, 3 | 1, 2, 3 | 2, 3 |

As readily arises from the foregoing, document__4 is included with document__1 in the same union set for the first function (since it shares bucket 5 with document__1 and bucket 7 with document__3). Document__4 is included with document__1, document__2 and document__3 in the same union set for the second function (since it shares bucket 5, 6 and 7 with document__1, document__2 and document__3). Likewise, document__4 is included with document__1 for the third function (since it shares bucket 7 with document__1, and document__4). The intersection between the sets (in accordance with step 303) leads to announcing document__4 as near duplicate to document__1.

Note that the mapping of a document to buckets in respect of a given function may be regarded as a non-limiting example for a signature of the document. The signature is short (in terms of the memory space allocated for representing it) and allows for rapid determination of near candidates for duplicate indications. Thus, by the latter embodiment, applying the Union/Intersection operations on the bucket results is efficient in terms of the computation resources, thereby enabling relatively fast calculations in the case that the near duplicate indications need to be determined in respect of large portfolio of documents.

The description above with reference to certain embodiments, exemplified the case where all functions are bounded by a certain value. In accordance with certain other embodiments, the functions are bounded by different values max, min. For instance, m different functions are applied to a document d, and return m respective values, say $d_{rank\_1}$, $d_{rank\_2}$, ... $d_{rank\_m}$. In accordance with certain embodiments, those m values are inserted to a database, or a specific data structure. When there is a need to get all near duplicate candidates for document x, the corresponding m ranks (for m distinct functions), for this particular document x are calculated, say $e_{rank\_1}$, $e_{rank\_2}$, ... $e_{rank\_m}$. The candidates near duplicate documents d are such that such that $|x_{rank\_i} - d_{rank\_i}| \leq \delta_i(f_i, th)$, where $\delta_i(f_i, th) = \alpha(th) \cdot |max_i - min_i|$ for all $1 \leq i \leq m$ Note that in accordance with certain embodiments of the invention, different min and or max values may apply to two or more out of the m functions.

As readily arises from the description above, it is possible to determine in one cycle of calculation whether a document A is candidate for near duplicate to more than one other document.

In accordance with certain other embodiments, at least one of the functions has a different characteristic. For example the function is not bound by max and min values. For this function type said $\delta(f, th, A) = \alpha(th) \cdot max\, f(A)$.

Suppose that there are two functions: The first $f_1$ is the total number of words in a document, and the second $f_2$ is a classifier (ranging from 0 to 1). Suppose document_1 got the following ranks:

| $f_1$ | $F_2$ |
|---|---|
| 200 (words) | 0.63 |

The ranks will be inserted to table called NearDupe Table Document_2 (constituting document A) got the following ranks:

| $f_1$ | $F_2$ |
|---|---|
| 220 (words) | 0.72 |

In accordance with certain embodiments, in order to find all near-duplicate document to document_2, the following SQL query is generated, but first $\delta(f, th, A)$ is set to the following values (for the specific case where $\delta(f_1, th, A) = f_1(A) \cdot \alpha(th)$ and $\alpha(th) = 1 - th$):

$\delta(f_1, th, A) = f_1(A) \cdot \alpha(th) = f_1(A) \cdot (1 - th) = 220 * (1 - 0.8) = 44$.

In the case of number of words, this means that we are looking for documents that differ no more then 44 words.

$\delta(f_2, th, A) = f_2(A) \cdot \alpha(th) = 0.72 * \alpha(th) = 0.1$ ($\alpha$ is a function on the level of equivalence, 0.8 in this case). In this case $\alpha(th)$ may be $\alpha(th) = -0.7 * th + 0.7 = 0.14$ SELECT documentID FROM NearDupeTable WHERE (f1 BETWEEN 220 + 44 AND 220 − 44) AND (f2 BETWEEN 0.72 + 0.1 AND 0.72 − 0.1)

As a result, document_1 with the respective function values 200 (falling in the range of 220−44 to 220+44) and 0.63 (falling in the range of 0.72−0.1 to 0.72+0.2), will be announced as candidate for near duplicate to Document_2.

Note that the invention is not bound by the specified two function types (i.e. a function bound by the min/max values or a function not bound by the min/max values).

Figure 5:
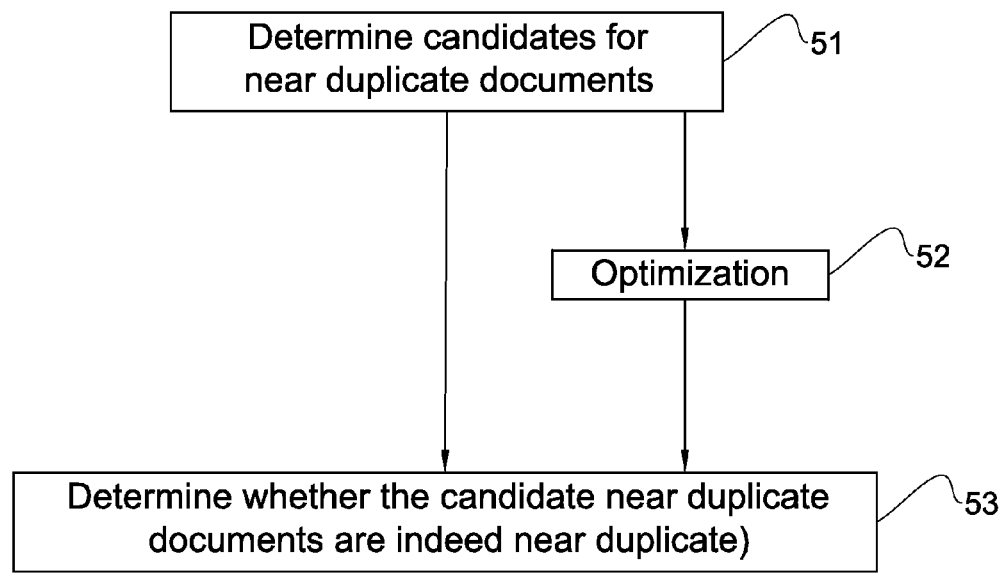
FIG. 5 illustrates a generalized flow diagram of operational stages in accordance with an embodiment of the invention.

Turning now to FIG. 5, there is shown a generalized flow diagram of operational stages in accordance with an embodiment of the invention;

Thus, having determined candidates for near duplicate indication (51) in the manner described in detail above, then in accordance with certain embodiments of the invention, another phase is applied for providing a quantitative indication (more fine tuned) on the extent of proximity between the documents (which, in certain embodiments, calls for determining whether the candidate near duplicate documents are indeed near duplicate) (52). To this end, a resemblance criterion between the candidates near-proximate documents will be used and in the case that said criterion is met, the documents are announced as candidates for near duplicate.

For example, in accordance with certain embodiments, a known per se measure for determining resemblance, such as the one disclosed in U.S. Pat. No. 5,909,677 Broder (disclosing a technique for resemblance of documents), may be used. Note that this approach is resource consuming (in terms of computational resources), however it is applied, preferably, only to those documents classified as candidates for near duplicate indication in accordance with the embodiments described above (e.g. the one described with reference to FIGS. 3 and 4).

The fined tuned determination in accordance with e.g. the Broder measure, is determined by applying intersection between the candidate documents divided by union thereof meet a certain threshold (constituting by this example said resemblance criterion). By one example, the intersection is determined by calculating the number of shingles that are shared by both documents, and the union is determined by the number of shingles that reside in either documents. Thus, for instance, if the first document has 200 shingles and the second has 250, and it turns out that 100 shingles are shared by both documents, whereas the number of shingles that reside in either or both of the documents is 300, then the documents are near duplicate in 33.3%. It may be determined, for example, that only those documents having shared shingle portion that exceed a given threshold are classified as near duplicate.

Note that the invention is not bound by the specified Broder measure, for the second phase of calculation.

Thus, in accordance with one embodiment, if a resemblance criterion stipulates that documents need to be near duplicate in 90%, a first phase would lead to documents which are candidates for near duplicate (as described, e.g. with reference to certain embodiments of FIG. 3) and then a second phase would apply a more fine tuned (by one embodiment, slower) analysis in order to determine which documents (from among those announced as candidates for near duplicate indication in the first phase) are near duplicate at the desired extent (by this example 90%).

A certain optimization (52 in FIG. 5) may be applied in order to expedite the second phase. Thus, in accordance with certain embodiments, this optimization would ignore those documents with shingle ratio that drops below the desired extent of near proximity. For instance, if the requirement for near duplicate is 90% and a certain document has 200 shingles, whereas the other has 250 shingles, the need to calculated the tedious intersection divided by union step, is obviated, since the ration between the shingles is 0.8 (80% being lower than the desired level of 90%). In the context of FIG. 5, those documents which were discarded in the optimization stage (52), will not be subject to the subsequent more fine tuned analysis of verifying the documents that are near duplicate (53).

Note that certain documents which may be announced as candidates for near duplicate in the first course calculation phase, may eventually turn out to be not near duplicate if they do not meet the fine tuned quantity test, of the kind described, by way of example only, above.

In accordance with yet another embodiment of the invention, the system is characterized in learning capability. Thus, by a non-limiting example, a new function is used; say by way of non-limiting example, a classifier.

As may be recalled, a classifier distinguishes between two groups of documents, the two opposite training groups accommodate documents which were classified as near duplicate in the first phase, but did not meet the second more fine tuned phase. This situation may happen in certain cases where the first phase failed to duly identify near duplicate documents. For example, if the first phase determined that documents 1 and 2 are candidates for near duplicate, but it turns out that they are not classified as near duplicate in the second phase, then document 1 would be included in the first group and document 2 in the second group. If another pair, say document 5 and 8 have similar fate, then document 5 is added to group 1 (together with document 1) and document 8 is added to group 2 (together with document 2). Based on the two groups, a new classifier is generated. If the system includes i classifiers and near duplicate indication is provided if the documents meet the condition for every one of the i classifiers, then in accordance with this embodiment, the newly generated classifier constitutes the i+1's classifier. Since however the latter signifies documents which succeeded to meet the candidate for near duplicate test of the first phase and failed to meet the near duplicate test of the second phase, any new document which meets the condition for the i+1 classifiers, has a better likelihood to meet also the second more fine tuned test, thereby improving the quality of the results obtained by the first coarse (and fast) test.

In accordance with a more generalized approach of certain embodiments of the invention, there is provided applying at least one additional calculation phase in order to determine whether candidates of near duplicate documents meet a criterion for near duplicate documents, and applying a learning phase based on documents that are determined to be candidates for near duplicate, but did not meet the criterion for near duplicate documents.

The invention has been described with reference to certain embodiments by employing the condition $|f_i(A)-f_i(B)| \leq \delta_i(f,\text{th},A)$, where $\delta_i$ is dependent upon at least $f,\text{th},A$.

In accordance with certain other embodiments, the following condition was employed, $|f_i(A)-f_i(B)| \leq \delta_i(f,\text{th})$, where $\delta_i$ is dependent upon at least $f,\text{th}$.

In accordance with certain other embodiments, the following condition was employed, $|f_i(A)-f_i(B)| \leq \delta_i(f,A)$, where $\delta_i$ is dependent upon at least $f,A$.

The invention is not bound by these specific embodiments. Thus, in accordance with a broader aspect of the invention, there is provided a system and method for determining that at least one object B is a candidate for near duplicate to an object A, comprising:
  (i) providing at least two different functions on an object, each function having a numeric function value;
  (ii) determining that at least one objects B is a candidate for near duplicate to an object A, if a condition is met, the condition includes: for any function $f_i$ from among said at least two functions, a relationship between results of the function when applied to the objects meets a given score.

In accordance with some of the embodiments described above, said relationship being $|f_i(A)-f_i(B)|$, and said score being $\delta_i(f,A)$, wherein $\delta_i$ is dependent upon at least $f$ and A, and wherein said condition is met if $|f_i(A)-f_i(B)| \leq \delta_i(f,A)$. In accordance with certain other embodiments described above, said score being $\delta_i(f,\text{th})$, wherein $\delta_i$ is dependent upon at least $f$ and th, and wherein said condition is met if $|f_i(A)-f_i(B)| \leq \delta_i(f,\text{th})$.

In accordance with certain other embodiments described above, said score being $\delta_i(f,\text{th},A)$, wherein $\delta_i$ is dependent upon at least $f$ th and A, and wherein said condition is met if $|f_i(A)-f_i(B)| \leq \delta_i(f,\text{th},A)$.

The invention can be used in various applications. Typical, yet not exclusive, examples of possible applications are: document management, content management, digitization, legal, business intelligence, military intelligence, search engines results pre- and post-processing, archiving, source code comparisons, management of email servers, management of file servers, Spam detection. These exemplary applications (and/or others can be utilized in various marketing channels such as stand alone products, as a component (OEM), etc. The specified applications may be applied online or offline, as required.

Note that in certain embodiments, a known per se voice to text module (or other means) may be employed such that input objects (being voice data) are converted to text based documents which then undergo near duplicate analysis according to selected embodiment(s) of the invention as described in detail above.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention has been described with a certain degree of particularity, but those versed in the art will readily appreciate that various alterations and modifications, maybe carried out without departing from the scope of the following Claims:

The invention claimed is:

1. A method for determining that at least one data object B is a candidate for near duplicate to a data object A with a given similarity level th, comprising:
  (i) providing from a storage at least two different functions on a data object, each function having a numeric function value;
  (ii) determining by a processor that at least one data object B is a candidate for near duplicate to a data object A, if a condition is met, the condition includes: for any function $f_i$ from among said at least two functions, $|f_i(A)-f_i(B)| \leq \delta_i(f,\text{th})$, wherein $\delta_i$ is dependent upon at least $f$,th.

2. The method according to claim 1, wherein said data objects being documents.

3. The method according to claim 2 wherein said documents include at least text and/or numbers.

4. The method according to claim 2 wherein said documents are word processor documents.

5. The method according to claim 2, wherein said documents are e-mails in selected format.

6. The method according to claim 5, wherein said format being a member selected from a group that includes Microsoft Outlook, Lotus Notes.

7. The method according to claim 2, wherein at least one of said functions being the number of features from known type in a document.

8. The method according to claim 2, for use in one or more members of the group that includes the following applications: document management, content management, digitization, legal, business intelligence, military intelligence, search engines results pre- and post-processing, archiving, source code comparisons, management of email servers, management of file servers.

9. The method according to claim 8, wherein said applications are marketed as a stand-alone application.

10. The method according to claim 8, wherein said applications are marketed as (OEM).

11. The method according to claim 1, wherein for a function $f$ said at least one characteristic being that $f$ is bound by a minimum value min and a maximum value max, and wherein said $\delta(f,\text{th}) = \alpha(\text{th}) \cdot |\max - \min|$.

12. The method according to claim 11, wherein $\alpha(\text{th}) = 1 - \text{th}$.

13. The method according to claim 1, wherein for a function $f$ said at least one characteristic being that $f$ is not bound by a minimum value min and a maximum value max, and wherein said $\delta$ is also dependent upon A wherein $\delta(f,\text{th},A) = \alpha(\text{th}) \cdot f(A)$.

14. The method according to claim 13, wherein $\alpha(\text{th}) = 1 - \text{th}$.

15. The method according to claim 1, wherein at least one of said functions being a classifier.

16. The method according to claim 15, wherein said classifiers being of a classifier type selected from a group that includes Bayesian Classifier, Decision Trees, Support Vector Machine Classifier.

17. The method according to claim 1, wherein at least one of said functions is a distance function.

18. The method according to claim 17, wherein the providing of distance function includes: generating for each document a vector of features where each entry in the vector is the frequency/occurrence of the feature, a feature being words from the documents.

19. The method according to claim 17, wherein said distance function is a member of a group that includes: $L^\infty$ (Maximum distance), $L^2$ (Euclidian distance), $L^1$ (sum of differences), and JS (Jensen-Shannon) distance between the two vectors.

20. The method according to claim 1, wherein said (i) and (ii) are applied on-line in respect of each new received object.

21. The method according to claim 1, further comprising: providing a database for storing signatures of data objects and determining if a data object has already been processed, including:
   i) associating to a data object a respective unique identification code;
   ii) calculating a signature for the data object;
   iii) checking if the calculated signature is stored in the database in which case the data object has already been processed; if not applying said (i) and (ii) in respect of the data object and at least one other data object in order to determine whether said data object and at least one other data object are near candidates.

22. The method according to claim 21, wherein said signature being checksum on an object or derivative thereof.

23. The method according to claim 21, wherein said database being hash table.

24. The method according to claim 1, further comprising applying at least one additional calculation phase in order to determine whether candidates of near duplicate data objects meet a criterion for near duplicate data objects.

25. The method according to claim 24, wherein the additional calculation phase including calculating a resemblance between two documents.

26. The method according to claim 24, wherein additional calculation phase including:
   i. calculating intersection between two candidates for near duplicate objects by calculating number of shingles that are shared by the two;
   ii. calculating union of two candidates for near duplicate data objects by calculating number of shingles that reside in either data objects;
   iii. determining that the two data objects are near duplicate by calculating the resemblance, and in case the result exceeding a predetermined value constituting said criterion, the data objects are near duplicate.

27. The method according to claim 26, further comprising, applying an optimization for discarding candidates for near duplicate data objects having a resemblance that drops below said predetermined value.

28. The method according to claim 24, wherein the at least one additional calculation phase is slower than the calculation of candidates of near duplicate documents, for any two documents.

29. The method according to claim 1, further comprising:
   a) applying at least one additional calculation phase in order to determine whether candidates of near duplicate data objects meet a criterion for near duplicate data objects;
   b) applying a learning phase based on data objects that are determined to be candidates for near duplicate, but did not meet the criterion for near duplicate data objects.

30. The method according to claim 29, wherein said (b) further comprises
   1. providing additional at least one function capable of discerning between data objects which were classified as candidates for near duplicate in a first phase, but did not meet said criterion in the additional phase; and
applying (a) and (b) for determining candidates for near duplicate, for any function from among said at least two functions and the additional at least one function.

31. The method according to claim 30, wherein at least one of said additional functions being a classifier.

32. The method according to claim 1, further comprising: applying said (i) and (ii) in respect of more than two data objects in order to determine whether at least two of said data objects are near duplicate.

33. The method according to claim 1, wherein at least two of said functions are of different type.

34. The method according to claim 1, wherein said condition is implemented using bucket data structure.

35. The method according to claim 1, wherein said data objects being voice data, and further comprising, converting said data objects to respective text based documents.

36. A method for determining that a document A is a candidate for near duplicate to at least one other document B, comprising:
- i) providing from a storage at least two different bounded functions fon document, and for each classifier providing a vector with n buckets where n is a function of th, each of size 1/n
- ii) receiving the document A, associating a unique document id to the document, and calculating a list of features by a processor;
- iii) calculating by the processor a rank=$f(A)$, where A being the list of features of the documents;
- iv) calculating by the processor, add document id to buckets in the vector, as follows:
    Floor(n·rank) (if greater than zero, otherwise discard this option), Floor(n·rank)+1, and Floor(n·rank)+2 (if less than n, otherwise discard this option)
- v) calculating union on documents id in the buckets, giving rise to set of documents id;
- vi) applying by the processor (ii)-(v), in respect to a different classifier from among said at least two classifiers, giving rise to respective at least two sets of documents id;
- vii) applying by the processor intersection to the at least two of the sets, stipulated in (vi), giving rise to at least two documents id, if any, being candidates for near duplicate.

37. The method according to claim 36, wherein said list of features being 1-grams, 2-grams, 3-grams, . . . , n-grams, where n is selected.

38. The method according to claim 36, further comprising applying at least one additional calculation phase in order to determine whether candidates of near duplicate documents meet a criterion for near duplicate documents.

39. The method according to claim 38, wherein the additional calculation phase including calculating the resemblance to verify the near-equivalence.

40. The method according to claim 38, wherein additional calculation phase including:
- i) calculating intersection between two candidates for near duplicate documents by calculating number of shingles that are shared by the two;
- ii) calculating union of two candidates for near duplicate documents by calculating number of shingles that reside in either documents;
- iii) determining that the two documents are near duplicate by calculating intersection divided by union, and in case the result exceeding a predetermined value constituting said criterion, the documents are near duplicate.

41. The method according to claim 40, further comprising, applying an optimization for discarding candidates for near duplicate documents having a shingle ratio that drops below said predetermined value.

42. The method according to claim 38, wherein the at least one additional calculation phase is slower than the calculation of candidates of near duplicate documents, for any two documents.

43. The method according to claim 36, wherein said documents being voice data, and further comprising, converting said documents to respective text based documents.

44. A method for determining that at least one data object B is a candidate for near duplicate to a data object A, comprising
- (i) providing from a storage at least two different functions on a data object, each function having a numeric function value;
- (ii) determining by a processor that at least one data object B is a candidate for near duplicate to a data object A, if a condition is met, the condition includes: for any function $f_i$ from among said at least two functions, $|f_i(A)-f_i(B)| \leq \delta_i(f,A)$, wherein $\delta_i$ is dependent upon at least $f$ and A.

45. The method according to claim 44, wherein said documents being voice data, and further comprising, converting said documents to respective text based documents.

46. A method for determining that at least one data object B is a candidate for near duplicate to a data object A, comprising
- (i) providing from a storage at least two different functions on a data object, each function having a numeric function value;
- (ii) determining by a processor that at least one data object B is a candidate for near duplicate to a data object A, if a condition is met, the condition includes: for any function $f_i$ from among said at least two functions a relationship between results of the function when applied to the data objects meets a given score.

47. The method according to claim 46, wherein said relationship being
$|f_i(A)-f_i(B)|$, and said score being $\delta_i(f,A)$, wherein $\delta_i$ is dependent upon at least $f$ and A, and wherein said condition is met if $|f_i(A)-f_i(B)| \leq \delta_i(f,A)$.

48. The method according to claim 46, wherein said documents being voice data, and further comprising, converting said documents to respective text based documents.

49. A system for determining that at least one object B is a candidate for near duplicate to an object A, comprising:
- a storage providing at least two different functions on an object, each function having a numeric function value;
- a processor associated with said storage and configured to determine that at least one object B is a candidate for near duplicate to an object A, if a condition is met, the condition includes: for any function $f_i$ from among said at least two functions, $|f_i(A)-f_i(B)| \leq \delta_i(f,A)$, wherein $\delta_i$ is dependent upon at least $f$ and A.

50. The system according to claim 49, wherein said determining that at least one object B is a candidate for near duplicate to an object A with a given similarity level th, and wherein said $\delta_i$ is further dependent upon th.

51. A system for determining that at least one object B is a candidate for near duplicate to an object A, comprising: a storage providing at least two different functions on an object, each function having a numeric function value;
- a processor associated with said storage, configured to determine that at least one object B is a candidate for near duplicate to an object A, if a condition is met, the condition includes: for any function $f_i$ from among said at least two functions a relationship between results of the function when applied to the objects meets a given score.

* * * * *

UNITED STATES PATENT AND TRADEMARK OFFICE
CERTIFICATE OF CORRECTION

| | | |
|---|---|---|
| PATENT NO. | : 8,015,124 B2 | Page 1 of 1 |
| APPLICATION NO. | : 11/572441 | |
| DATED | : September 6, 2011 | |
| INVENTOR(S) | : Amir Milo et al. | |

It is certified that error appears in the above-identified patent and that said Letters Patent is hereby corrected as shown below:

Column 25, Line 8, Claim 36:

Delete "fon" and insert -- f on --.

Signed and Sealed this
Twentieth Day of December, 2011

David J. Kappos
*Director of the United States Patent and Trademark Office*